May 5, 1931. T. C. HAZARD 1,804,378
APPARATUS FOR THE CONTROL OF INDUSTRIAL HEAT TREATMENT PROCESSES
Filed May 16, 1928 3 Sheets-Sheet 1

May 5, 1931.  T. C. HAZARD  1,804,378
APPARATUS FOR THE CONTROL OF INDUSTRIAL HEAT TREATMENT PROCESSES
Filed May 16, 1928  3 Sheets-Sheet 3

INVENTOR
Theodore C. Hazard
BY Popp & Powers
ATTORNEYS.

Patented May 5, 1931

1,804,378

UNITED STATES PATENT OFFICE

THEODORE C. HAZARD, OF ROCHESTER, NEW YORK

APPARATUS FOR THE CONTROL OF INDUSTRIAL HEAT-TREATMENT PROCESSES

Application filed May 16, 1928. Serial No. 278,218.

This invention relates to a vulcanizer which is more particularly intended for vulcanizing rubber footwear although the same is also applicable for other uses where similar problems are present.

One object of this invention is to provide a uniform cure by adapting means to obtain a uniform distribution of the heat throughout the vulcanizer.

The principal object of the invention, however, is apparatus for accurately controlling the vulcanizing process in accordance with a definite predetermined temperature schedule for the interior of the vulcanizer.

In vulcanizing rubber footwear, for instance, it is very important that shoes at the top, bottom, center and opposite ends of the vulcanizer be subjected to the same temperatures. During the first part of the cure, in accordance with the present invention, the temperature is gradually and uniformly raised from a starting point to a predetermined holding point. The temperature is then maintained at this holding point for the remainder of the cure. In the absence of any provision to prevent it, a wide variation in temperature in various parts of the vulcanizer is liable to take place, over curing is apt to occur at the higher temperature which would materially impair the wearing qualities of the rubber. By obtaining this accuracy of temperature control and uniformity of temperature throughout the vulcanizer during the cure, it is possible to compound the rubber to closer limits which results in a better finished product and fewer rejections, due to over or under curing.

In the accompanying drawings:

Fig. 5 is a sectional view, on an enlarged scale, of valve mechanism shown in Fig. 1.

In the following description similar characters of reference indicate like parts in the several figures of the drawings:

Figure 1:
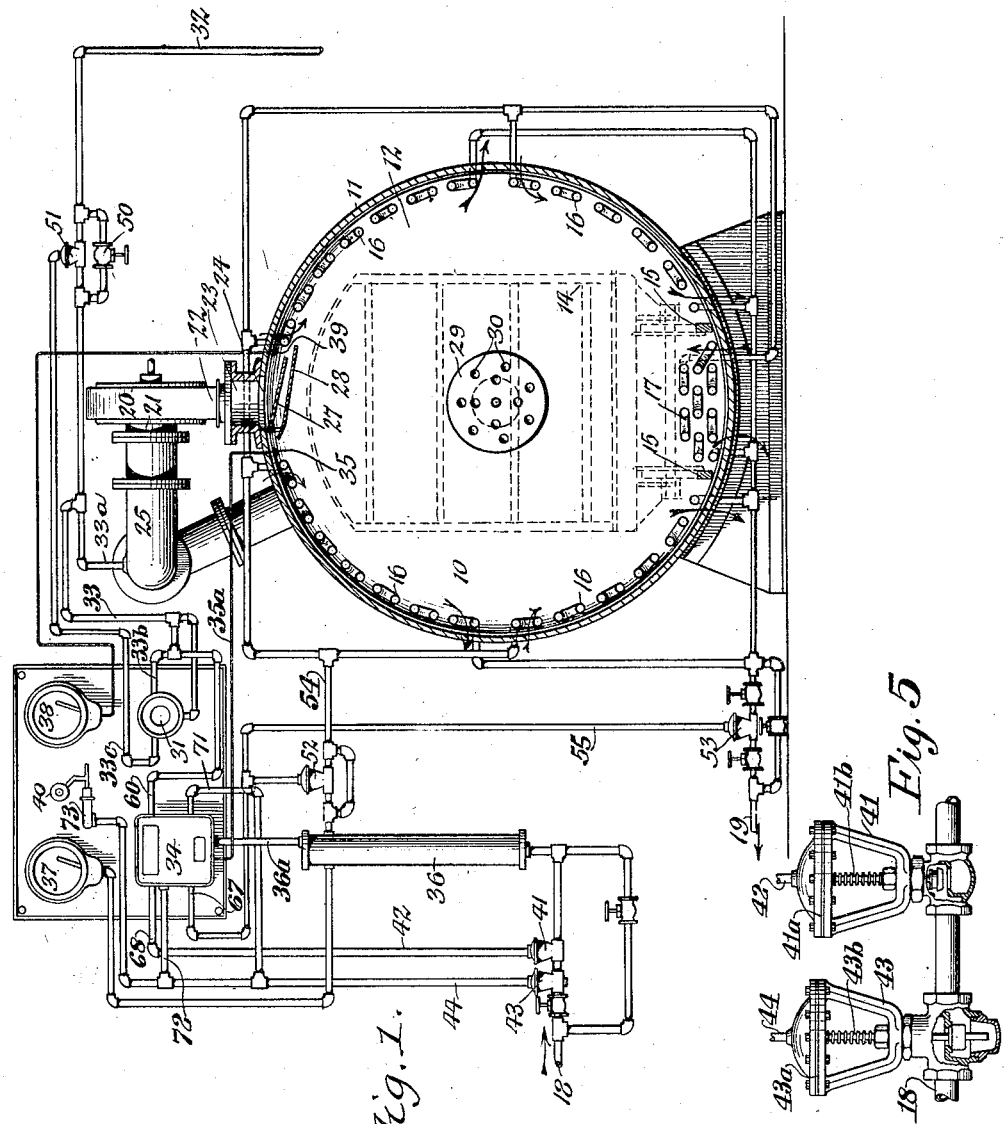
Fig. 1 is a vertical cross section of one form of vulcanizer embodying my invention and showing the means for indicating, regulating and controlling the pressure and heating medium.
Figure 2:
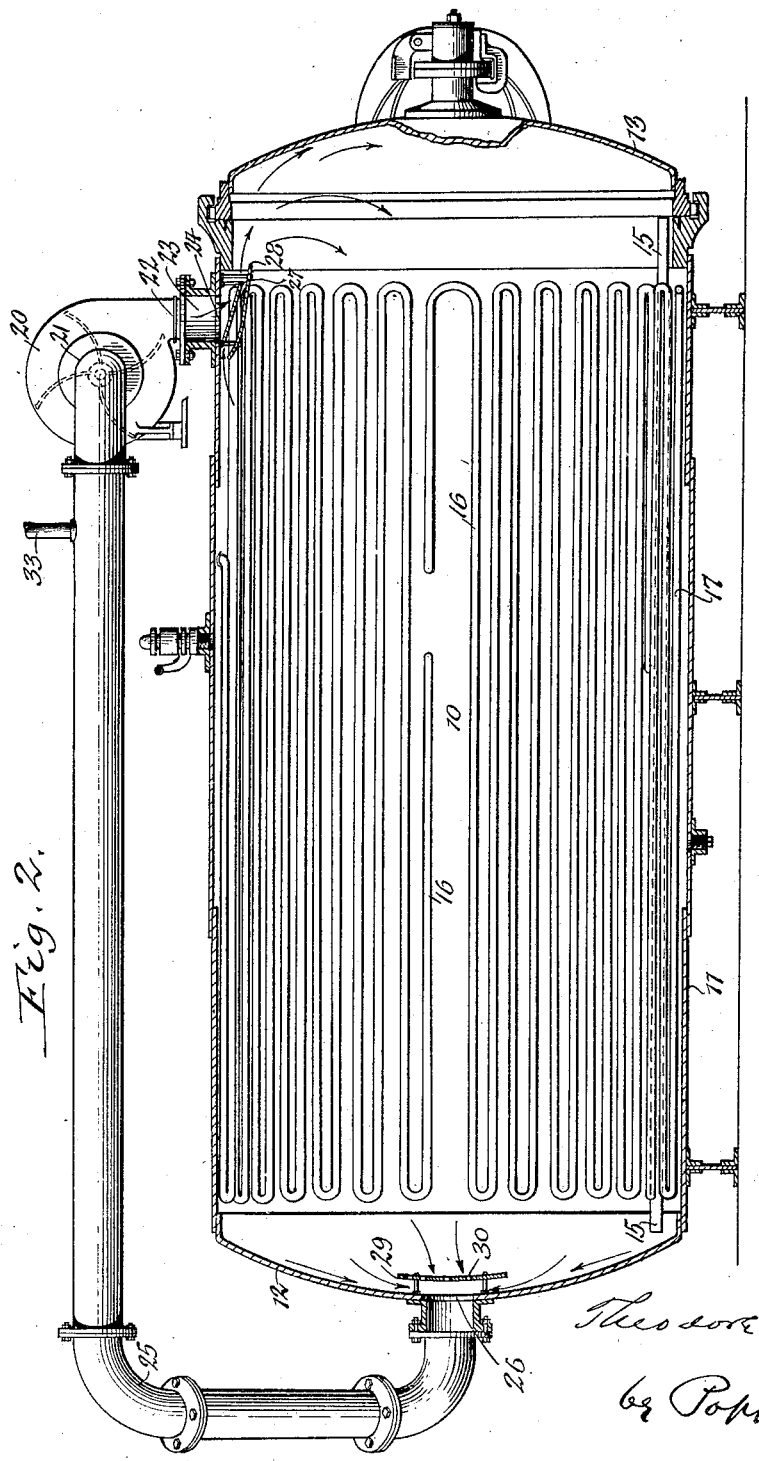
Fig. 2 is a vertical, longitudinal section of the vulvanizer shown in Fig. 1 in which air is introduced into the vulcanizing chamber at one point and withdrawn at another, and in which the front end of the vulcanizing chamber can be opened and closed by a door for loading and unloading the material to be heated while the opposite or rear end of the chamber is permanently closed.
Figure 3:
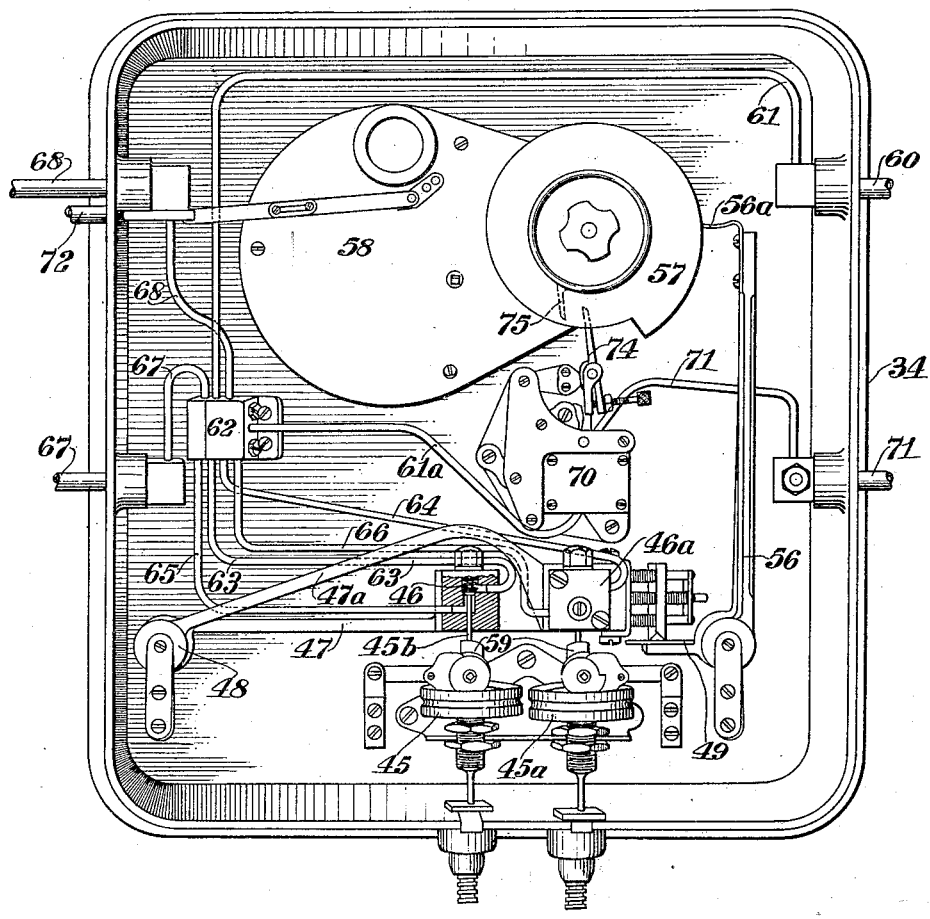
Fig. 3 is a perspective view, partly in section, of the principal control device forming part of the invention.
Figure 4:
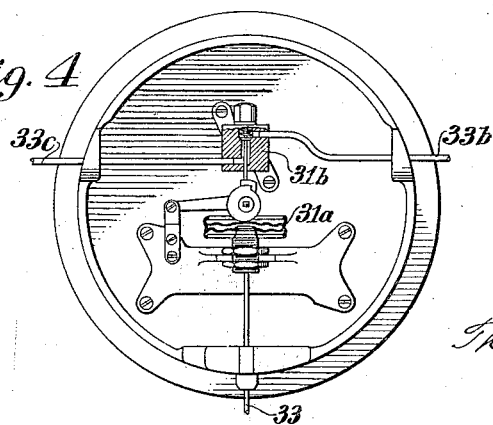
Fig. 4 is a sectional view, on an enlarged scale, of an air pressure regulator device indicated in Fig. 1.

Referring to Figs. 1–3, the numeral 10 represents the vulcanizing chamber which is adapted to receive the articles to be treated and which in this particular instance is constructed in the form of a sheet metal tank having a horizontal cylindrical body 11, a permanent or fixed head 12 at its rear end and an opening at its front end which is adapted to be opened and closed by a door 13 and through which the goods to be treated are introduced and removed from the vulcanizing chamber. The articles to be treated are preferably placed on a wheeled truck shown by dotted lines 14 in Fig. 1 and adapted to run on a track consisting preferably of rails 15 mounted lengthwise on the lower part of the tank.

The interior of the vulcanizing chamber may be heated by any suitable means but preferably by a plurality of coil sections 16, arranged in single file around the inner side of the body of the chamber from the top to the bottom thereof along opposite sides of the track, and a lower coil section 17 arranged in the form of a cluster between the rails of the track, as shown in Figs. 1 and 2. Each of these coil sections is provided with an individual inlet and outlet for receiving and discharging a heating medium which preferably consists of steam supplied by a main steam pipe 18 from any suitable source which communicates with the inlets of the several coil sections and discharged as water of condensation through a discharge pipe 19 communicating with the outlets of the several coil sections. By thus subdividing the coil into sections proper drainage is assured and maximum heat transfer obtained and each section carries the same steam pressure throughout the cure.

The means provided for automatically and forcibly circulating the air in the vulcanizing chamber consist generally of an air propeller 20 having an inlet 21 and an outlet 22 and a supply conduit 23 connecting the outlet of the propeller with an air inlet 24 of the vulcanizing chamber, and a return discharge conduit 25 connecting the outlet 26 of the vulcanizing chamber with the inlet of the propeller. The latter preferably has the form of a blower or fan the casing of which has the axial inlet 21 and the tangential outlet 22 and rotary fan blades within the casing which may be turned by power from any available source. In the present case the air inlet 24 of the vulcanizing chamber is arranged at the front end of the uppermost part of the vulcanizer body and the air outlet 26 is arranged in the center of the rear or fixed head. The pipe connections between the blower and the vulcanizing chamber should be as short as possible and the outlet of the blower in this case is therefore connected with the air inlet of the chamber by the short pipe 23 and the return pipe 25 extends lengthwise over the chamber and down to the outlet of the same. The air is thus forced lengthwise through the vulcanizing chamber from the front end to the rear end thereof and then returned by the blower from the rear end to the front end of the chamber so that a constant circulating of the air is thus obtained. This organization of the vulcanizing chamber and blower thus provides a closed system which permits of circulating the air within the system at a proper rate and at the same time using the heat in the coils to raise the temperature of the mass of air and material on the inside of the chamber, and thereby maintaining a uniform temperature throughout the vulcanizer at all times.

Suitable baffles arranged at the inlet and outlet connections of the vulcanizing chamber to effect proper distribution of the air. The distributing baffle at the air inlet of the chamber comprises two plates mounted on the body, an outer plate 27 which extends across the inner end of the inlet 24 but is spaced therefrom and inclines lengthwise toward the front door, as shown in Fig. 2, and also inclines laterally or circumferentially, as shown in Fig. 1, and an inner plate 28 which is spaced from the inner side of the outer plate 27 and is inclined both longitudinally forward and laterally or circumferentially in the same direction as the companion inner plate. By this means the air entering the vulcanizing chamber through the inlet 24 will be deflected laterally and given a swirling motion and also directed forwardly and downwardly so as to sweep to the front door, thereby preventing the formation of any dead air spaced or pockets and instead thoroughly agitate all of the air in the chamber and cause the same to be heated uniformly and operate equally on all parts of the material under treatment within the chamber. As the stream of air moves forwardly through the passage between the outer baffle plate 27 and the body of the chamber a suction effect, similar to that of an injector, is produced on the air in the passage between the outer and inner baffle plates 27, 28, which causes a flow of air from the upper part of the chamber toward the front door and thereby further aids in bringing all the air into circulating, mixing the air, maintaining the same at a uniform temperature and insuring equalization in the curing effect on the material under treatment.

The baffle at the rear end of the chamber consists of a circular disk or plate 29 supported on the rear head of the chamber and extending across the inner end of the air outlet 26 but spaced therefrom around its entire circumference so as to form an intervening air passage and also provided with a plurality of air openings 30. By means of this rear baffle the air is prevented from moving rearwardly directly to the outlet and instead compels the air to be drawn uniformly from all parts of the rear end of the chamber and thus avoid the formation of any dead air spaces.

The mechanism for controlling the operation may have various forms. It is understood, therefore, that the disclosure in the drawings is solely for the purpose of illustrating one concrete embodiment of the invention. In fact, the apparatus shown is what I now consider as a preferred embodiment of the invention.

A supply line 32 of compressed air is connected by means of a conduit 33a with the interior of the vulcanizing chamber, this last mentioned connection being preferably effected through the return pipe 25 of the air circulation system. A branch pipe 33 connects the supply line 32 with a pressure regulator 31 of the usual type for so regulating the diaphragm admission valve 51 that the pressure within the vulcanizing chamber is maintained substantially constant. The branch 33 is connected to a pressure responsive diaphragm 31a or other equivalent device controlling a valve 31b whereby the flow of air from the branch 33b to the airline 33c is regulated. The arrangement is such that an increase in air pressure above the limit determined, say thirty pounds, causes the pressure-responsive device 31a to actuate the valve 31b to admit more air from branch 33b to line 33c, which in turn effects a movement of the valve 51 tending to decrease the flow of air through the pipe 32.

Having now reference to Fig. 3, which shows more in detail the control device 34 indicated in Fig. 1, 45 and 45a are two pressure-responsive diaphragms of well known type for actuating valves 46 and 46a respectively. Valve 46 is carried upon an arm 47 and valve 46a is carried upon an arm 47a, both arms being pivotally supported at one end upon a pin 48 or the like.

The free ends of the arms 47 and 47a rest upon a plate 49 forming an arm of a bell-crank lever, the other arm 56 having a finger 56a for contact with a cam 57 driven by a clock 58. As the cam disk is rotated by the clock mechanism, the arm 56 is angularly moved inwardly or outwardly depending upon the shape of the cam surface. The weight of the arms 47 and 47a upon the plate 49 operates to maintain the finger 56a in contact with the cam 57 and conversely, the cam 57 through the arm 56 and the plate 49 effects a raising or lowering of the free ends of the arms 47 and 47a and, therefore also a raising or lowering of the valve mechanisms 46 and 46a.

The diaphragms 45 and 45a under the action of the pressure medium within them expand with increase of pressure and, through adjustable contact members 59 press upwardly upon the valve stems 45b whereby the valves progressively open. As to detail of construction, the arrangement thus far described is generally similar to the construction disclosed in the patent to Norwood, 1,630,305.

An air intake 60, connected with the compressed air supply conduit 32, as is indicated in Fig. 1, is in fluid connection with one side of the valves 46 and 46a through a conduit 61, leading to a connector block 62 and conduits 63 and 64 leading therefrom to the admission side of the valves. From the service side of the valves 46 and 46a, conduits 65 and 66, respectively, lead back to the connector block where they are in fluid connection with pipes 67 and 68 respectively. Pipe 68 leads to the diaphragm chamber of valve 41, while pipe 67 leads to the diaphragm chambers of the valves 52 and 53. The valve 41 controls the steam supply pipe 18 connected to the reservoir 36 which in turn is connected through pipe 54 with the coils 16. Valve 52 controls the admission of steam from the reservoir 36 to the coils while valve 53 controls the discharge pipe 19.

In addition to the valves 46 and 46a there is a valve 70 generally known as the blow-off valve. This valve controls a fluid connection from the conduit 61 through the conduit 61a to the conduit 71 which, in turn, is principally connected with the diaphragm chamber of the valve 43 in the steam supply pipe 18 and also with a pneumatic clock starter mechanism 72 and with a pneumatic switch 73 controlling a light 40. The valve 70 is controlled by the cam 57 through a trip finger 74 coming in contact with an abutment 75 on the cam. The trip finger 74 is part of an automatic release for closing the valve 70. The detail of construction, which does not form part of this invention, is fully disclosed in the patent above referred to. The abutment of trip 75 may be adjusted to close the valve 70 at any predetermined time relative to the cycle of operation.

To facilitate the understanding of the invention, Fig. 5 shows the valves 41 and 43 in section. The valve 41, generally known as a direct action valve is operated by the action of the compressed air upon the diaphragm 41a to close, and to open under the action of spring 41b when the flow of compressed air is decreased or stopped. Valves 51, 52 and 53 are of the same type. Valve 43, on the other hand, generally referred to as a reverse action valve, is normally closed by the spring 43b and opened by the action of compressed air upon the diaphragm 43a overcoming the force of the spring 43b.

As a matter of general practice, a pressure gauge 37 is connected to the reservoir to indicate the pressure conditions therein and an index thermometer 38 is connected to the vulcanization chamber to indicate the temperature conditions therein. These instruments are merely collateral and do not enter into the operation of the apparatus constituting the invention proper.

Having explained in a general manner the mechanism forming part of the control device 34, its function and practical significance are as follows:

The diaphragm 45a is in fluid connection with the reservoir 36 through pipe 36a while the diaphragm 45 is connectd through a capillary 35a with a fluid-filled bulb 35 in the vulcanization chamber 10. With increase of steam pressure in the reservoir 36 above the limit set, the diaphragm 45a will expand and will tend to open the valve 46a. As the valve 46a is opened, compressed air can flow to the diaphragm chamber of the valve 41 causing the diaphragm to partly or entirely close the valve 41 thereby reducing the steam pressure in the reservoir. With decrease of the steam pressure below the limit set, the diaphragm 45a will recede and allow the valve stem 45b to return to its original position closing the valve 46a. The diaphragm valve 41 is now free to open up allowing steam to again enter the reservoir 36. With increase of temperature in the vulcanization chamber 10, the expansive action of the fluid in diaphragm 45 will cause expansion of the latter tending to open valve 46. As the valve 46 is opened, compressed air can flow to the diaphragm chambers of valves 52 and 53 causing the diaphragms to partly or entirely close the valves 52 and 53 respectively, whereby the flow of steam to the coils 16 is reduced. With decrease of temperature in the vulcanization chamber below the limit set, the valve 46a is allowed to close so that flow of compressed air to the diaphragm chambers of valves 52 and 53 is decreased or stopped, with the result that under the action of the usual springs previously referred to the valves 52 and 53 open up more or less to allow more steam to enter the coils 16.

The cam 57 has a definite shape to force the arm 56 gradually outwardly from a definite initial position so as to gradually raise the plate 49 and with it the valve mechanisms 46 and 46a during the operation, with the result that it requires progressively a higher steam pressure in the reservoir 36 and a higher temperature in the vulcanization chamber 10 to close the valves 46 and 46a. Expressed differently, at the beginning of the operation, the valve 46 is closed at a relatively low steam pressure, say 45 lbs. and opened when the pressure falls below that pressure and, if it were not for the cam and its action, just enough steam would be admitted to the reservoir to maintain the pressure therein substantially at 45 lbs. However, as the valve 46 is progressively raised, the valve 41 is so operated as to allow the pressure to gradually build up from 45 to say 75 lbs. at the end of the cycle. Similarly the valve 46a is closed at the beginning at a relatively low temperature in the vulcanization chamber, say at 160° F. and the valves 52 and 53 so operated as to gradually allow the temperature in the chamber to rise to, say 250° F. at the end of the operation.

The time-temperature schedule just referred to is about that required for the vulcanization of shoes. For other industrial processes to which the apparatus may be applied, this time-temperature schedule may be varied, primarily by changing the size and shape of the cam 57.

The important and salient point of this arrangement is that the steam entering the vulcanization chamber is ample for the required heating effect without danger of being excessive. If the pressure head were not reduced in proportion to the demand in the chamber, the temperature regulation in the chamber 11 would not only be more difficult, but the heat impounded in the coil would at times be much too large and would, even if the admission valve were entirely closed, dissipate enough heat in the chamber to drive the temperature so far above the limit desired as to damage or ruin the goods.

The reservoir 36 is in effect a pressure-reducing vessel for effecting a reduction in the steam pressure in proportion to the heat demand in the vulcanization chamber. The steam pressure in the reservoir 36 is allowed to gradually build up in proper proportion to the increased heat demand according to the time-temperature schedule.

At the end of the cycle of operation, the blow-off valve 70 is automatically closed. The air is therefore shut off from the diaphragm chamber of valve 43 with the result that the latter is closed and entirely shuts off the steam from the reservoir and vulcanization chamber.

In order to obtain the best regulating effect, the valves 52 and 53 are so adjusted relatively to each other that valve 53 opens first and closes last while valve 52 opens last and closes first. This adjustment may be obtained by modifying one or more of various factors. Thus, the size and force of the spring acting against the diaphragm may be varied or the adjustable air leaks in the diaphragm chambers or the fluid conduit are balanced against each other to produce the desired effect.

By this arrangement and disposition of parts, the valve 52 which controls the super-atmospheric steam does not allow too much steam to enter the coils 16, while the expanded low-pressure steam is given more time to leave the coils 16. In addition, the opening of valve 53 in advance of valve 52 permits condensed steam to flow out of the coil 16 before the live steam is admitted and to thus make room for the live steam, allow the latter to expand more of its heat energy for useful work and make the system of control more responsive to temperature changes in the vulcanization chamber.

In the foregoing reference has been made to one specific form of mechanism for controlling the admission of steam to the coils, the flow of steam and condensed steam or, in general, used-up steam out of the coils, and the control of the steam pressure, i. e., of the amount of the stored-up heat energy in the steam. The mechanism employed for carrying out the regulation and control is, in itself, not new and has been described in detail only in order to facilitate the understanding of the process carried out. It is understood that the process, operation and result may be obtained by different types of mechanism.

While I have employed coils for heating the interior of the vulcanization chamber, I wish to have it understood that the steam may be applied in various other ways.

In the arrangement described I employ a single cam and a single time-piece for varying the relation of the diaphragms 45, 45a and the valves 46 and 46a so as to vary the degree of response of the pressure regulating means and of the temperature-responsive means and thereby vary the flow of steam from the supply 18 to the reservoir 36, on the one hand, and the flow of steam from the reservoir into and through the coils 16, on the other hand. It is understood that this arrangement is merely a simplification. So far as the invention and the principle of operation are concerned, two separate cams might be driven by the clock to separately control the valves 46 and 46a. So far as the principle of time control is concerned, the single clock has the same effect as two separate clocks for separately controlling the valves 46 and 46a. I therefore do not want to be limited to the disclosure of a single time piece or a single cam and a single contact arm 56.

I claim:

1. In apparatus of the character described, the combination with a steam-heating means and a steam supply therefor, of means for varying the thermal effect of the steam-heating means in accordance with a definite time and temperature schedule, including a fluid connection between the steam supply and the heating means and means for varying the steam pressure in said connection in a definite relation to the heat demand upon the heating means by the said time-temperature schedule.

2. In apparatus of the character described, the combination with a steam heating means and a steam supply connected thereto, of means for varying the thermal effect of the steam-heating means in accordance with a definite time and temperature schedule, including a steam reservoir between the supply and the steam-heating means and means for regulating the admission of steam to the reservoir to vary the pressure in the reservoir in accordance with the heat demand upon the heating means by the said time and temperature schedule.

3. In apparatus of the character described, the combination with a steam-heating means and a steam supply connected thereto, of means for varying the thermal effect of the steam-heating means in accordance with a definite time and temperature schedule, including a steam reservoir between the supply and the steam-heating means, means responsive to pressure conditions within the reservoir for regulating the admission of steam to the reservoir and time-controlled means for varying the degree of response of said pressure-responsive means.

4. In apparatus of the character described, the combination with a steam-heating means and a steam supply connected thereto, of means for varying the thermal effect of the steam-heating means in accordance with a definite time and temperature schedule, including a steam reservoir between the supply and the steam-heating means, means responsive to the thermal effect of the steam-heating means for regulating the flow of steam from the reservoir to the heating means, time-controlled means for varying the degree of response of said thermally responsive means, means responsive to pressure conditions within the reservoir for regulating the flow of steam from the supply to the reservoir and time-controlled means for varying the degree of response of said pressure-responsive means.

5. In apparatus of the character described, the combination with a steam heating means and a steam supply connected thereto, of time-controlled means for progressively varying the flow of steam from the supply to the heating means, means for reducing the pressure of the steam entering the heating means and time-controlled means operative upon said pressure reducing means to vary the pressure reduction in a definite relation to the rate of steam flow to the heating means.

6. In apparatus of the character described, a heating chamber, steam heating means for heating the material to be treated, having an inlet and an outlet, a steam reservoir having an intake for connection with a steam supply and an outlet connected with the inlet for the steam-heating means, means responsive to the steam pressure within the reservoir for controlling the flow of steam to the reservoir and means responsive to temperature conditions within the vulcanizing chamber for controlling the flow of steam from the reservoir through the heating means.

7. In apparatus of the character described, a heat-treating chamber, steam-heating means for heating the material to be treated, having an inlet and an outlet, a steam reservoir having an intake for connection with a steam supply and an outlet connected with the inlet for the steam-heating means, means for regulating the flow of steam to the reservoir, means for regulating the flow of steam from the reservoir to the heating means, means for regulating the flow of fluid out of the heating means, means responsive to the steam pressure within the reservoir for controlling the means for regulating the flow of steam to the reservoir and means responsive to temperature conditions with the chamber for controlling the means for regulating the flow of steam from the reservoir to the steam-heating means and the means for regulating the flow of fluid out of the heating means.

8. In apparatus of the character described, the combination with a heat-treating chamber, steam-heating means for heating the material to be treated and a steam supply, of a steam reservoir between the steam-heating means and the steam supply and means responsive to pressure conditions within the reservoir for controlling the flow of steam from the supply to the reservoir.

9. In apparatus of the character described, the combination with a heat-treating chamber, steam-heating means for heating the material to be treated and a steam supply, of means for regulating the heating effect of the heating means in accordance with a definite time and temperature schedule, including means interposed between the steam supply and the heating means for reducing the steam pressure, means for regulating the admission of steam from the supply to the said pressure-reducing means, means responsive to pressure conditions within the pressure reducing means for controlling the said regulating means and means for varying the effect of the said pressure-responsive means in accordance with the temperature changes called for by said schedule.

10. In apparatus of the character described, the combination with a heat-treating chamber, of a steam-heating means therefor, a steam supply connected with the heating means, means for regulating the flow of steam from the supply to the heating means to progressively increase the heating effect thereof and means for progressively increasing the pressure of the steam entering the heating means in a definite relation to the increase of the said heating effect.

11. In apparatus of the character described, the combination with a heat-treating chamber, of a steam-heating means therefor, a steam supply connected with the heating means, a valve for regulating the flow of steam into the heating means, a valve for regulating the flow of fluid out of the heating means, means responsive to temperature conditions within the chamber for interdependently controlling the said regulating means and time-controlled means for varying the regulating effect.

12. In apparatus of the character described, the combination with a heat-treating chamber, of a steam-heating means therefor, a steam supply connected with the heating means, a valve for regulating the flow of steam into the heating means, a valve for regulating the flow of fluid out of the heating means, means responsive to temperature conditions within the chamber for interdependently controlling the said regulating means and time-controlled means for varying the regulating effect, the said valves being so adjusted relatively to each other that the second mentioned valve opens in advance of and closes after the first mentioned valve.

13. In apparatus of the character described, the combination with a steam heating means and a steam supply therefor, of means for varying the thermal effect of the steam heating means in accordance with a definite time-temperature schedule, including a fluid connection between the supply and the heating means and means responsive to pressure conditions in said connection for varying the steam pressure in said connection in a definite relation to the heat demand upon the heating means by the said time-temperature schedule.

In testimony whereof I affix my signature.

THEODORE C. HAZARD.